United States Patent [19]

White

[11] Patent Number: 5,116,509
[45] Date of Patent: May 26, 1992

[54] ELECTRODEIONIZATION AND ULTRAVIOLET LIGHT TREATMENT METHOD FOR PURIFYING WATER

[75] Inventor: Janet White, Boston, Mass.

[73] Assignee: Millipore Corporation, Bedford, Mass.

[21] Appl. No.: 404,728

[22] Filed: Sep. 8, 1989

[51] Int. Cl.⁵ .................... B01D 61/42; B01D 61/44
[52] U.S. Cl. ................... 210/644; 204/302; 210/681; 210/748
[58] Field of Search ............... 210/634, 638, 641, 642, 210/644, 649–654, 748, 660, 681, 683, 695, 685; 204/299 R, 301, 302

[56] References Cited

U.S. PATENT DOCUMENTS

| | | | |
|---|---|---|---|
| 4,632,745 | 12/1986 | Giuffrida | 204/301 |
| 4,747,929 | 5/1988 | Siu et al. | 204/301 |
| 4,931,160 | 6/1990 | Giuffrida | 204/301 |

*Primary Examiner*—Frank Sever
*Attorney, Agent, or Firm*—Andrew T. Karnakis; Paul J. Cook

[57] ABSTRACT

A process is provided for removing organics and ions from liquid. Water to be purified is first exposed to ultraviolet(UV) radiation to oxidize organics in the liquid. The UV-treated water then is passed through an electrodeionization apparatus having an ion depletion compartment containing mixed anion and cation exchange resin beads and an ion concentration compartment in a given separation stage having an anode and a cathode. A second liquid is passed through the concentration compartment which is free of or filled with ion exchange resin beads. Ions under the influence of D.C. potential pass from the depletion compartments into the concentration compartments through ion permeable membranes. The electrodeionization apparatus can be operated continuously in conjunction with the UV radiation step since resin regeneration is not required.

22 Claims, 8 Drawing Sheets

ELECTRODEIONIZATION AND ULTRAVIOLET LIGHT TREATMENT METHOD FOR PURIFYING WATER

BACKGROUND OF THE INVENTION

The present invention relates to a water purification system which utilizes an electrodeionization step and an ultraviolet radiation treatment step.

Prior to the present invention water has been purified to reduce its ion content and to reduce total organic carbon (TOC) by ion exchange treatment which effects ion concentration reduction and by exposure to ultraviolet radiation which effects oxidation of organics to form more easily removable products. Such a process is disclosed, for example, in European patent application No. 0,265,031 published Apr. 27, 1988. The system disclosed comprises a quartz tube containing an ultraviolet light through which water is poured in combination with a deionization step. In one embodiment, water is circulated sequentially through the deionization step whenever organic extractables are removed to the ultraviolet light exposure step where the organics are oxidized. It is disclosed that the 38 hours of continuous circulation through the system was required in order to reduce TOC to 1.5 parts per billion (ppb). In a second embodiment, a typical water supply system is disclosed which includes the deionization step and the ultraviolet light exposure step. In this system the water is recirculated between these two steps a plurality of times. Two alternate deionization steps are employed with one being on-line while the second is either regenerated or new ion exchange resin is added thereto. Because ion exchange resins contain organic extractables, one cannot reduce TOC to 0% concentration in a system which utilizes deionization. In addition, a batch process is required when utilizing deionization because organics are deposited on the ion exchange resin and the resin must be replaced or regenerated periodically. The addition of new resin or regeneration of depleted resin introduces an additional major problem since the new or regenerated resin contains significant quantities of organic extractables which will enter the purification system when the deionization step containing the new resins comes on- line.

Means other than ultraviolet light exposure also have been proposed to modify soluble organics in order to render them more susceptible to removal from water. Such means include exposure to sulfite, reducing pH and electrochemical oxidation. In particular, exposure to sulfites results in the formation of adducts with organics such as formaldehyde.

Electrodeionization has been proposed as a means for replacing deionization to effect ion removal from water. However, prior to the process disclosed in U.S. Pat. No. 4,632,745, no practical electrodeionization process has been available for producing substantially ion-free, high resistivity water. However, the resins utilized in electrode-ionization process also contain organic extractables.

Accordingly, it would be desirable to provide a water purification system which is capable of producing high restivity water while eliminating TOC. Furthermore, it would be desirable to provide such a process which is continuous rather than a batch process.

SUMMARY OF THE INVENTION

Water is purified continuously to effect ion removal and essentially complete removal of TOC on a one pass process by exposure to ultraviolet radiation to effect oxidation of organics followed by electrodeionization in a particular manner. In the ultraviolet radiation exposure step, water is exposed to radiation having a wavelength that promotes oxidation of organics, e.g., 184.9 nanometers. In the electrodeionization step, the water is passed through one or more ion depletion compartments of a particular design adapted to produce high restivity (meg-ohm) water continuously. The organics treated in the ultraviolet radiation exposure step are passed from the water in the ion depletion compartments through ion permeable membranes into adjacent concentration compartments within the electrodeionization step. The electrodeionization step can be operated by passing the water being treated in one pass through a given ion depletion compartment or by effecting serpentine flow within two or more adjacent ion depletion compartments. In addition, the electrodeionization step can be conducted under conditions where voltage polarity is reversed periodically. Additional process steps can be added such as an ultrafiltration step in order to further improve product purity.

DESCRIPTION OF SPECIFIC EMBODIMENTS

In the process of this invention water to be purified is passed sequentially through an ultraviolet light (UV) treatment step and then through an electrodeionization step. In the UV treatment step, the incoming water is exposed to UV radiation for a time period that promotes organics oxidation, e.g., 150 to 300 nm, preferably 180–190 nm for at least about 20 seconds. In accordance with this invention, it has been found that the organics in the treated water are converted to products which are easily removed from the water in the downstream electrodeionization step. The UV treated water is passed through an electrodeionization step for removal of ions and TOC products either in the incoming water to be treated or products in the UV treatment step. The electrodeionization step is comprised of ion depletion compartments which are positioned in alternating relationship with ion concentration compartments. The ion depletion compartments are defined by alternating anion permeable membranes and cation permeable membranes which are sealed in a manner to prevent leakage between ion depletion compartments and ion concentration compartments. The ion depletion compartments contain a mixture of anion resin beads and cation resin beads to promote ion transfer from water in the ion concentration compartments. The alternating ion depletion compartments are positioned between an anode and a cathode. Water to be purified is passed through the ion depletion compartments while water used to accept ions from the ion depletion compartments is passed through the ion concentration compartments. In operation, an electrical voltage is applied to the anode and cathode which promotes ion transfer from the water in the ion depletion compartments through the anion permeable membrane and the cation permeable membrane and into the water passing through the ion concentration compartments. In the electrodeionization step, the ion removed from the water are not retained by the membranes or resin beads but are removed with the water passing through the ion concentration compartments. In addition, in electrodeionization the extractables from the resin in the dilution compartments are removed because of the rapidity with which ionic species are transferred by the ion exchange resins to the ion permeable membranes. Therefore, the electrodeionization step can be operated continuously without the need to replace or regenerate the resin particles or membranes.

Figure 1:
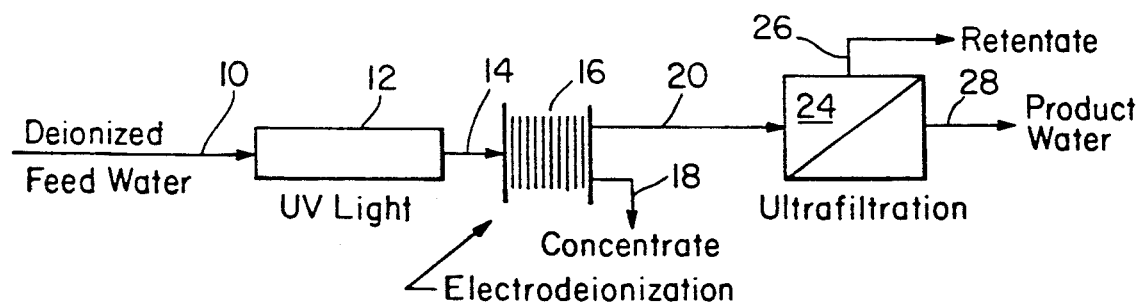
FIG. 1 is a schematic drawing illustrating the process of this invention.

Referring to FIG. 1, water to be purified 10, e.g., tap water or filtered deionized water is passed through an ultraviolet radiation exposure step 12 wherein organics in the water are oxidized. The water is exposed to ultraviolet radiation having a wavelength of 150 to 300 for a time period of 20 to 60 seconds. The liquid product 14 of step 12 is directed to an electrodeionization step 16 wherein ionic species as well as organics are passed from the water to be purified into a concentrate stream 18. The product water 20 of electrodeionization step is free of organics which, after being exposed to ultraviolet light radiation are in a form which permits their passage through an ion permeable membrane during electrodeionization. The product water stream then can be passed through an ultrafiltration step 24 to remove microorganisms in the water to produce a retentate stream 26 and a sterile, organics-free, deionized product water stream 28. The ultrafiltration step 24 is not essential to the present invention. Other water processing steps can be added, such as filtration, ozonation or chlorination in order to improve water quality, if desired.

Figure 2A:
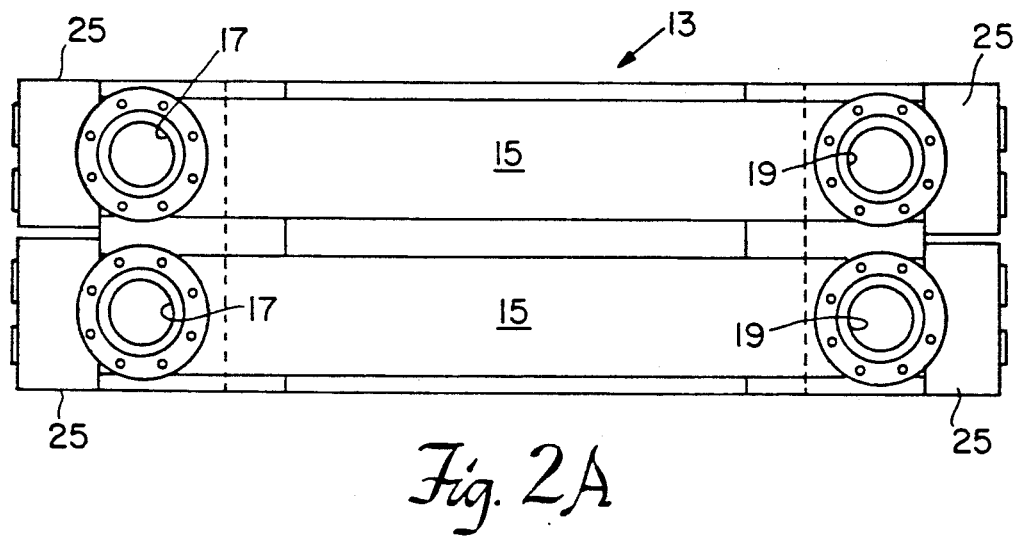
FIG. 2A is a side view of an apparatus useful to expose water to ultraviolet radiation.
Figure 2B:
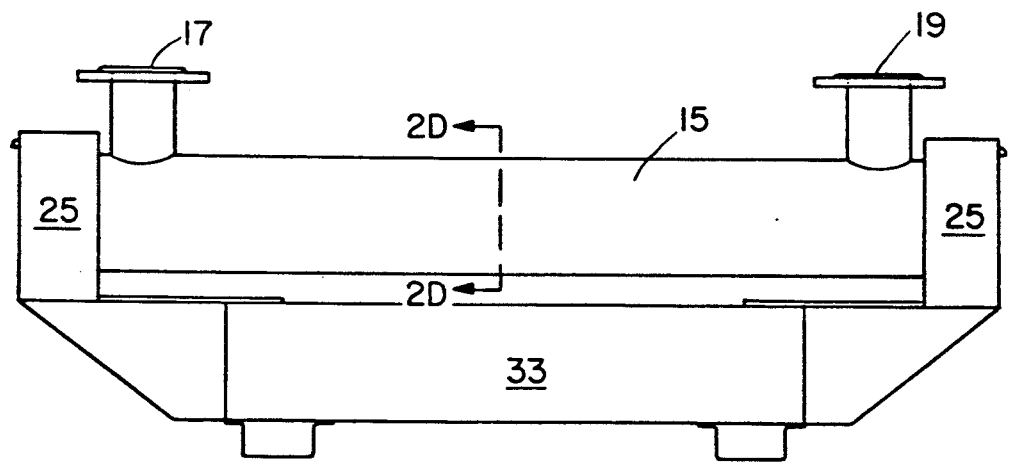
FIG. 2B is a top view of the apparatus of FIG. 2A.
Figure 2C:
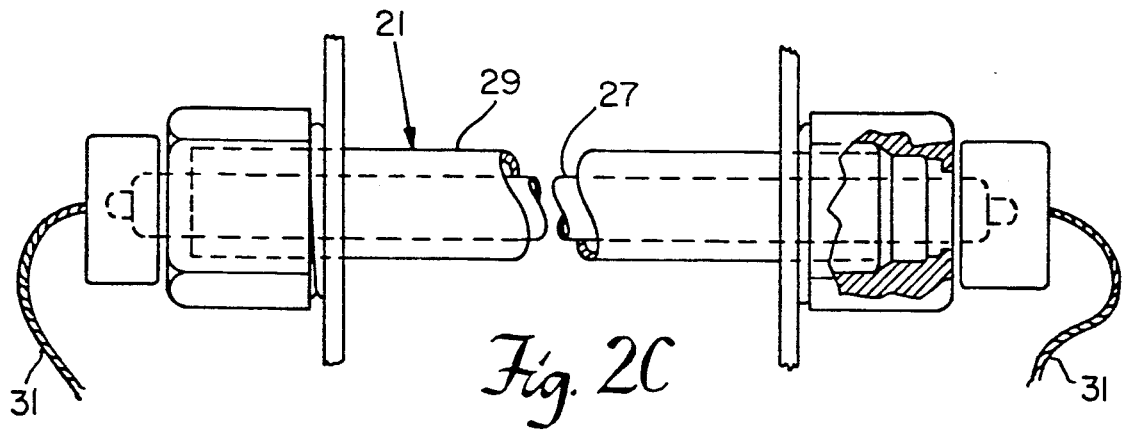
FIG. 2C is a side view of an ultraviolet lamp apparatus.
Figure 2D:
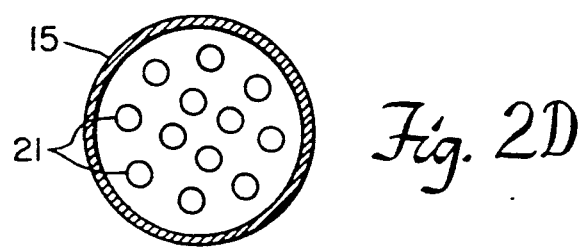
FIG. 2D is a cross-sectional view of a sterilization chamber taken along line 2D—2D of FIG. 2C.

Referring to FIGS. 2A, 2B, 2C and 2D, the ultraviolet water treatment apparatus 13 includes two sterilization chambers 15 each of which is provided with an inlet 17 and an outlet 19. A plurality of ultraviolet lamp apparatus 21 are positioned within chambers 15 and are secured to end plates 25 which are connected to an electrical power supply 33. As shown in FIG. 2C, the ultraviolet lamp apparatus 21 includes an ultraviolet lamp 27, a quartz tube 29 and electrical connections 31. In use, the ultraviolet lamps 27 are activated and water is passed through inlets 17, sterilization chambers 15 and outlets 19 to be directed to an electrodeionization step 16.

In a first specific embodiment of this invention, the electrodeionization step is conducted by the process and with the apparatus disclosed in U.S. Pat. No. 4,632,745, issued Dec. 30, 1986 which is incorporated herein by reference. As disclosed in the patent, an electrodeionization apparatus is provided wherein each electrodeionization electrical stage includes an anode and a cathode, and their compartments, a series of concentration compartments and a series of depletion compartments that contain a mixture of anion exchange resin and cation exchange resin. The depletion compartments are formed so that the ion exchange resin mixture is housed within independent discrete subcompartments each of which has a width of about four inches or less, preferably between about 0.5 and 1.5 inches. The discrete subcompartments are formed by securing, such as by bonding, both the anion permeable membrane and the cation permeable membrane to the periphery of the depletion compartment and to ribs which extend across the thickness of and along the entire length of the depletion compartment so that each subcompartment is defined by a pair of ribs, the anion permeable exchange membrane and the cation permeable membrane. In this embodiment, it has been found that the thickness and width of the depletion compartments are critical to achieving efficient operation of the electrodeionization apparatus. The solid ion exchange material positioned within the subcompartments are constrained from moving between subcompartments by the ribs and ion permeable membranes. Representative suitable solid ion exchange materials include fibers or beads or the like. When employing ion exchange beads, typical bead diameter is about 0.04 inches or less, preferably between about 0.033 and about 0.012 inches in diameter (20 to 50 mesh).

The electrodeionization apparatus can comprise one or a plurality of stages. In each stage, an anode is positioned at an opposite end of a stack of depletion and concentration compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentration compartments constructed as set forth herein. The liquid to be depleted of ions can be passed in parallel through each depletion compartment in each stage and a second liquid can be passed through each concentration compartment in parallel in each stage in order to effect removal of ions from the first liquid in the depletion compartments into the second liquid in the concentration compartments. When a plurality of stages are utilized, the liquid removed from the depletion compartments in an upstream stage can be directed in series into the depletion compartments in the next adjacent downstream stage. Similarly, the liquid removed from the concentration compartments of an upstream stage can be directed in series to the concentration compartments in the next adjacent downstream stage. Electrolyte can be passed through the spacer adjacent each electrode in the electrodeionization apparatus and is removed from the electrodeionization apparatus.

The subcompartments in the depletion compartments of the first specific embodiment set forth above have a controlled thickness and width in order to sustain high efficiency for ion depletion over long periods. The thickness of the subcompartment should be between about 0.25 and about 0.05 inches, preferably between about 0.06 and 0.125 inches. The width of the subcompartment should be between about 0.3 and about 4 inches, preferably between about 0.5 and about 1.5 inches. There is no limit on the length of the compartment other than as dictated by practical construction and fluid pressure loss considerations. Obviously, the longer the subcompartment length, the greater the ion removal from the liquid therein. Generally, the length of the subcompartments are between about 5 inches and about 70 inches. When it is desired to remove only a particular anion or particular cation, 100% of the appropriate exchange material is used. Usually it is desired to remove both cations and anions in order to produce a purified liquid product. When utilizing strong acid-base resin materials such as beads, the ratio of anion exchange resin beads to cation exchange resin beads generally are about 60 to 40 by volume. By utilizing the subcompartment structure in the depletion compartments, efficient mixing of the liquid and the beads therein is attained while avoiding channeling of the liquid through the depleting compartment. Thus, efficient interchange of the ions and the liquid in the depletion compartment with the ions in the beads to effect ion removal from the liquid in the depletion compartment is attained. Furthermore, it has been found that by controlling the geometry of the subcompartments as set forth herein, relatively low energy requirements for the electrodeionization apparatus can be utilized even over long periods to attain desired liquid purity.

Figure 3:
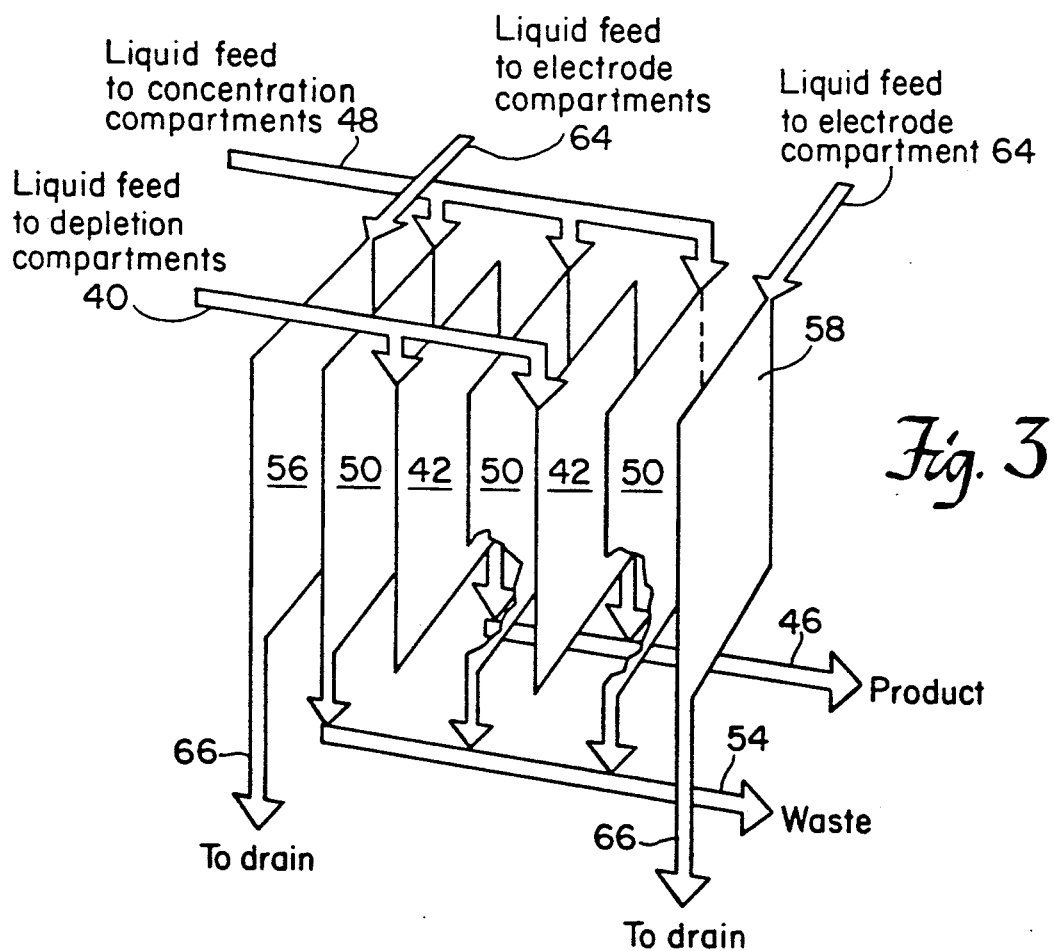
FIG. 3 is a schematic view illustrating the operation of one embodiment of the electrodeionization step of this invention.

Referring to FIG. 3, the flowpaths of the liquids in the various compartments of the first specific embodiment set forth above are explained. Liquid to be purified enters inlet 40, passes through depletion compartments 42, and is recovered from outlet 46. Concentrating liquid is passed through inlet 48 through concentration compartment 50 and hence through outlet 54 to. Liquid electrolyte is circulated through electrode compartments 56 and 58 from inlets 64 and is discarded to drain through outlets 66.

The electrodeionization apparatus can be operated periodically during the process under conditions to polarize water in the depletion compartments therein to form hydrogen and hydroxyl ions. Generally, operating voltage about 1.5 volts/cell pair will effect water polarization. The hydrogen ions are selectively removed from the depletion compartments through the cation permeable membranes thereby to decrease the pH of the water in the concentration compartment to about 5 or less. By operating in this manner any scale formed in the concentration compartments is dissolved. The low pH effluent from the anode compartment then can be directed to the cathode-compartment in order to dissolve any scale formed therein. During this step product from the depletion compartments is discarded because of its elevated pH. The effluent from the electrode compartments formed during the scale removal step is discarded. Normal operating voltages then are resumed and the product from the depletion compartments is recovered.

The first specific embodiment of the electrodeionization apparatus also can be backwashed to remove small particles retained within the apparatus, particularly within the depletion compartments. Since the inlets to the subcompartments are smaller than the size of the ion exchange materials therein, only the smaller particles are removed therefrom during backwashing. Backwashing merely comprises passing cleansing liquid into the apparatus through the normally used liquid outlet(s) and removing the cleansing liquid through the normally used liquid inlet(s).

Any anion permeable membrane or cation permeable membrane having the strength to withstand the operating pressure differential, typically up to about 5 psi, can be utilized in the present invention, It should be pointed out that sealing of the membranes to the ribs forming the subcompartments permits the use of higher operating pressures and enhances the apparatus of the prior art since the assembly strength is thereby increased. Representative suitable anion permeable membranes include a homogeneous type web supported styrene-divinlybenzene based with sulfonic acid or quarternary ammonium functional groups sold under the identifications CR61-CZL-386 and AR 103-QZL-386 by Ionics, Inc.; a heterogeneous type web supported using styrene-divinylbenzene based resins in a polyvinylidene fluoride binder sold under the identifications MC-3470 and MA-3475 by Sybron/Ionac; homogeneous type unsupported-sulfonated styrene and quaternized vinylbenzylamine grafts of polyethylene sheet sold under the name, Raipore by RAI Research Corporation; a homogeneous type web supported styrene-divinylbenzene based with sulfonic acid or quaternary ammonium functional groups sold under the name Aciplex by Asahi Chemical Industry, Ltd.

The electrodeionization step can be controlled by measuring product water conductivity from all or any one of the stages and adjusting the process parameters including process voltage, liquid flow velocities, temperatures, pressures, and electrical current accordingly.

The following is a description of two methods for controlling the demineralization of an electrodeionization system. The methods can be used separately or in combination in a single or multi-electrical staged system. The first method senses the resitivity and temperature of the feed water and the appropriate cell pair voltage is applied to demineralize the liquid to the desired fraction salt removal.

The second method senses the product resistivity and temperature that is used to control the voltage of the stage to produce water of the desired quality. This type of voltage control can be used to provide product water of a pre-selected quality.

An example of a two-stage system is as follows: The first stage is operated at a variable voltage based on the feed water quality (about 0.5 to 2.0 volts per cell pair) appropriate to achieve approximately 70–80 percent salt removal by using a predetermined resistivity/temperature/percent salt removal relationship. The automatically applied voltage permits operation below the polarization point, thus assuring efficient operation without scaling. The second stage is operated at a variable voltage based on the product water quality (about 0.5 to 2.0 volts per cell pair), appropriate to provide water of a pre-selected quality. Since the feed water to the second stage is product water from the first, the second stage feed is less prone to scaling. For this reason polarization in the second stage is acceptable, and the voltage can therefore be varied to any degree to provide the required product quality.

In a second specific embodiment of this invention, the electrodeionization step can be operated under conditions of serpentine flow between an anode and a cathode. In the second specific embodiment of this invention, the depletion compartments are arranged and are provided with inlet and outlet means so that water to be purified is passed through at least two depletion compartments between a given set of anode and a cathode in each stage. Improved ion removal efficiency is attained with the multiple pass process of this embodiment of the invention as compared to a process wherein water to be purified is passed thorugh one depletion compartment in each stage having a length equal to the combined lengths of the multi depletion compartments in each stage. The depletion compartments also are formed so that the ion exchange resin mixture is housed within independent discrete subcompartments of the size set forth above.

In the second specific embodiment, the electrodeionization. apparatus can comprise one or a plurality of stages. In each stage, as set forth above, an anode is positioned at an opposite end of a stack of depleting and concentrating compartments from an end at which a cathode is positioned. The liquid to be depleted of ions can be passed in parallel through each depletion compartment in each stage in order to effect removal of ions from the first liquid in the depletion compartments into the second liquid in the concentrating compartments. In any event, the liquid to be purified in this embodiment is passed through at least two depletion compartments in each stage. The direction of flow within the depletion compartments is not critical and can be in the same direction or in an opposite direction to the flow in an adjacent compartment. When a plurality of stages are utilized, the liquid removed for the depletion compartments in an upstream stage can be directed in series into the depletion compartments in the next adjacent downstream stage. Alternatively, feed water can be directed in a counter flow arrangement in depletion compartments comprising a second stage. Electrolyte can be passed through the spacer adjacent each electrode in the electrodeionization apparatus and is removed from the electrodeionization apparatus.

In a third specific embodiment of this invention, an electrodeionization apparatus is provided wherein each electrodeionization stage includes an anode compartment. a cathode compartment and, a series of ion concentration compartments which alternate with a series of ion depletion compartments. Each of the concentration compartments and depletion compartments contains a solid ion exchange material such as a mixture of anionic exchange resin and cation exchange resin. The concentration and depletion compartments are formed so that the ion exchange resin mixtures are housed within independent discrete subcompartments each of which have a width of about 4 inches or less, preferably between 0.5 and about 1.5 inches. The discrete subcompartments are formed by securing, such as by bonding, both the anion permeable membrane and the cation permeable membrane to the periphery of the depletion and concentration compartments and to ribs which extend across the thickness of and along the length of the concentration and depletion compartments, thus, each subcompartment is defined by a pair of ribs, the anion permeable membrane and the cation permeable membrane.

As regards the third specific embodiment, the term "dual compartment" means a compartment formed of an odd number of permeable membranes, at least one depletion compartment and at least one concentration compartment, each of which compartments are divided into subcompartments, as described above. The ion permeable membranes are arranged so that the anion permeable membrane and the cation permeable membrane alternate along the thickness of the dual compartment. Thus, the dual compartment can include one more cation permeable membrane than anion permeable membrane or can include one more anion permeable membrane than cation permeable membrane of the odd number ion permeable membranes. It has been found in accordance with this invention that the dual compartment structure permits reversing voltage polarity in a manner which does not require directing a portion of the liquid product to waste due to the presence of the solid ion exchange material positioned within the subcompartments by the ribs and by the ion permeable membranes. Representative suitable solid ion exchange materials include fibers, woven fibers, beads or the like. When utilizing ion exchange beads, a typical bead diameter is about 0.04 inches or less and usually between about 0.033 and about 0.012 inches in diameter. When utilizing a resin bead mixture, a volume ration of anion to cation exchange beads of 4.0 to 0.5 can be used. Electrolyte can be passed through the spacer adjacent to each electrode in the electrodeionization apparatus and is removed from the electrodeionization apparatus. Optionally, electrolyte from the spacer adjacent the electrode can be passed through one or more neutral zones prior to being directed to waste. In accordance with this invention, scale and organics build up within the electrodeionization apparatus, particularly at the electrodes, is prevented by periodically reversing the voltage polarity such that the original anode becomes a cathode and the original cathode becomes the anode. When voltage polarity is reversed, the original depletion compartments become concentration compartments and concentration compartments become depletion compartments. At the electrodes any accumulated scale is cleaned during the anodic cycle and any accumulated organics are dissolved during the cathodic cycle and are removed. Also any accumulated scale in the concentrating compartments is dissolved during the initial period of the diluting cycle and is rinsed to drain. In addition, any organic foulants accumulated during the diluting cycle are desorbed from the resin and membranes during the concentrating cycle by the action of increased salinity and removed in the waste stream so that their presence does not adversely affect the quality of the water or function of the equipment.

During voltage polarity reversal, it would be expected that a portion of the liquid recovered from the compartments would need be discarded since ion removal would not be sufficiently rapid during the polarity reversal. However, surprisingly, in accordance with this invention, the ion removal from the newly formed depletion compartments is sufficiently rapid and during the initial period after reversal there is a delay time between polarity reversal and deterioration of water quality in the newly formed concentration stream so that the liquid product need not be discarded at any time during or between any cycle. In other words, the conductivity of the liquid product from either or both of the newly formed depletion or concentration compartments are sufficiently low as to render the liquid product acceptable in one stream or the other stream or both. This result is very desirable since it eliminates the need for valving and conduit means for directing a portion of the liquid product from the newly formed depletion compartment to waste followed by a reversal of the system flow to effect recovery of the liquid product from the newly formed depletion compartments. Also since polarity reversal in accordance with this invention permits continuous recovery of high quality product, the prior art need for a holding tank system with associated pumping capacity is desirably eliminated.

In addition, it would be expected that the time between polarity reversal would be short, to prevent the immediate localized formation of scale on surfaces such as the cathode and anion membranes. However, localized scaling is minimized by the pH buffering action of the ion-exchangers in the concentrating and/or electrode streams. Therefore, the time between polarity reversal can be extended resulting in purer product on the average. The subcompartments in the depletion and concentration compartments have the controlled thickness and width set forth above in order to sustain high efficiency of ion depletion over long periods.

The product stream can be directed to an apparatus having essentially the same physical structure as the apparatus described but without means for polarity reversal to produce 10 meg-ohm quality water or better. Polarity reversal in this downstream step need not be utilized since the product water of this invention is highly pure.

Figure 6:
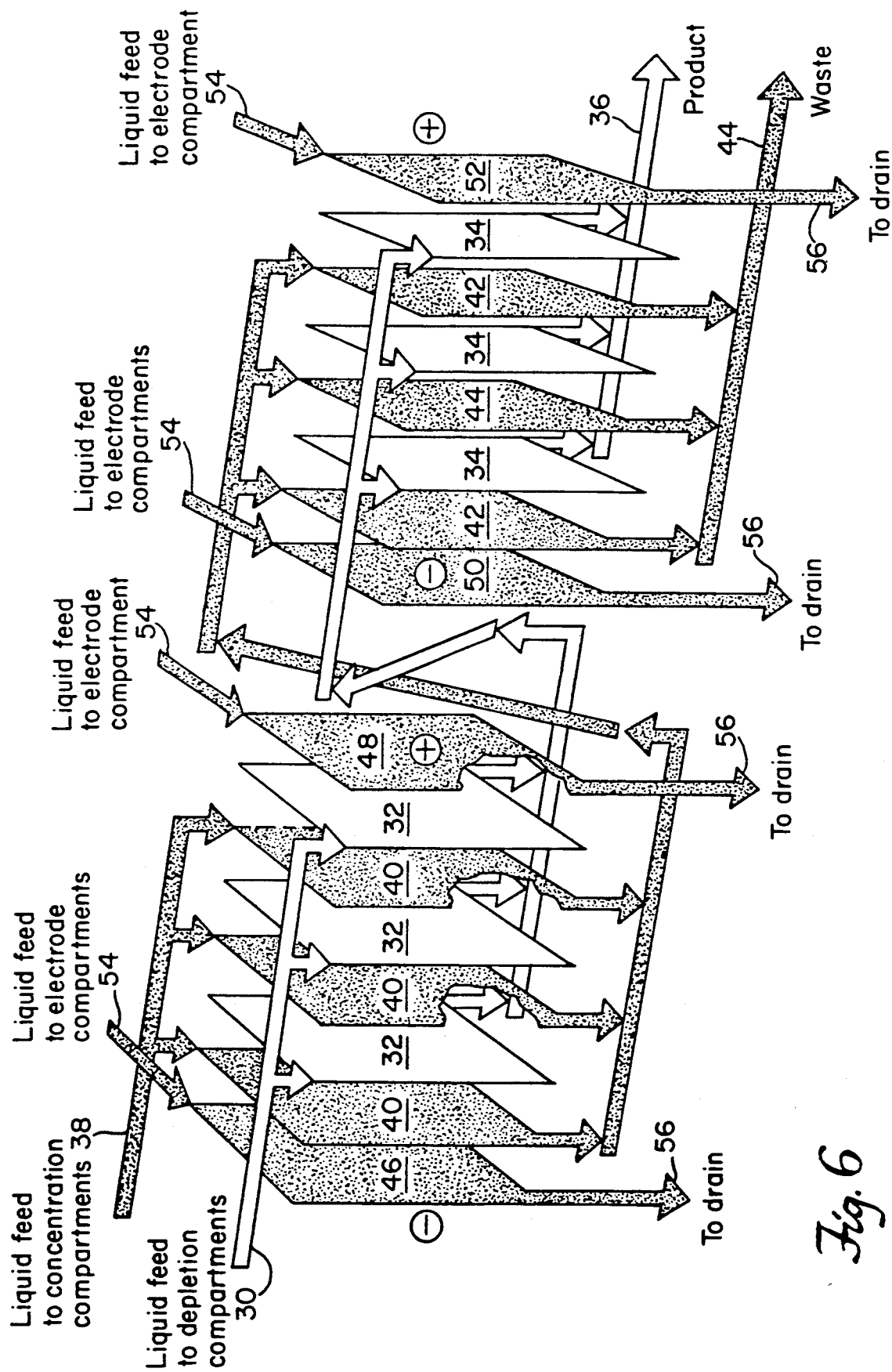
FIG. 6 and FIG. 7 are schematic views illustrating an embodiment of this invention wherein polarity is reversed during operation of the electrodeionization step.

Referring to FIG. 6, liquid to be purified enters inlet 30 and passes through depletion compartments 32, through depletion compartments 34 and then is recovered from outlet 36. Concentrating liquid is passed through inlet 38, through concentration compartments 40 and 42 thence through outlet 44 to drain. Liquid electrolyte is circulated through electrode compartments 46, 48, 50 and 52 from inlets 54 and is discarded to drain through outlets 36. When operated in the mode shown in FIG. 6, electrode compartments 46 and 50 comprise cathodes and electrode compartments 48 and 52 comprise anodes.

Figure 7:
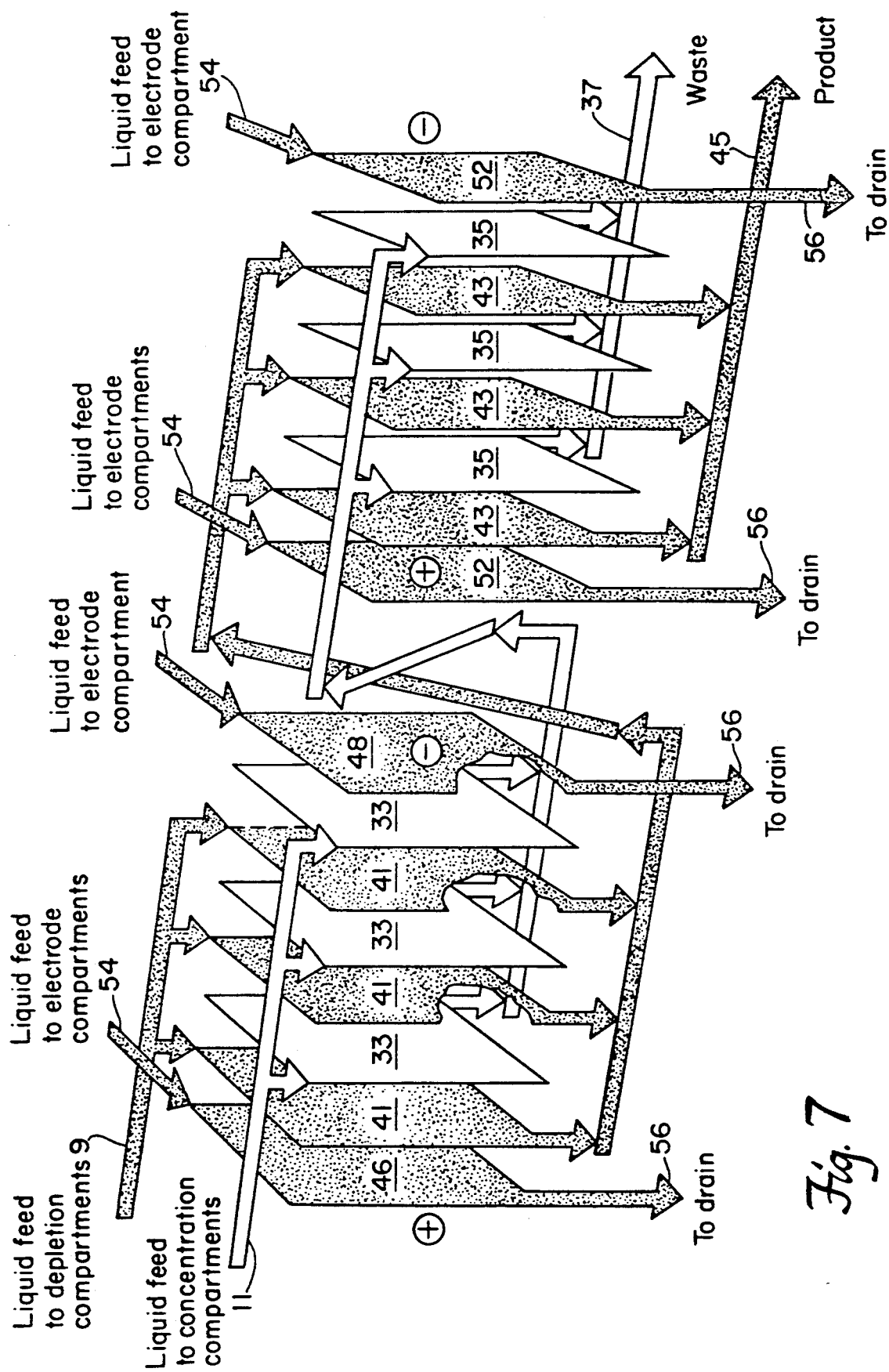

Referring to FIG. 7, the polarity of the electrodes is reversed such that electrodes 46 and 50 comprise anodes and electrodes 48 and 52 comprise cathodes where a liquid electrolyte is circulated therethrough from inlets 54 and is discarded to drain through outlets 56. Because of the polarity reversal, the depletion compartments 32 of FIG. 6 now become concentration compartments 37 and the depletion compartments 34 of FIG. 6 become concentration compartments 35. Similarly, the concentration compartments 40 and 42 of FIG. 6 become depletion compartments of 41 and 43. Therefore, the product outlets 36 of FIG. 6 becomes a waste stream 37 while the waste stream 44 of FIG. 6 becomes a product stream 45.

Figure 8:
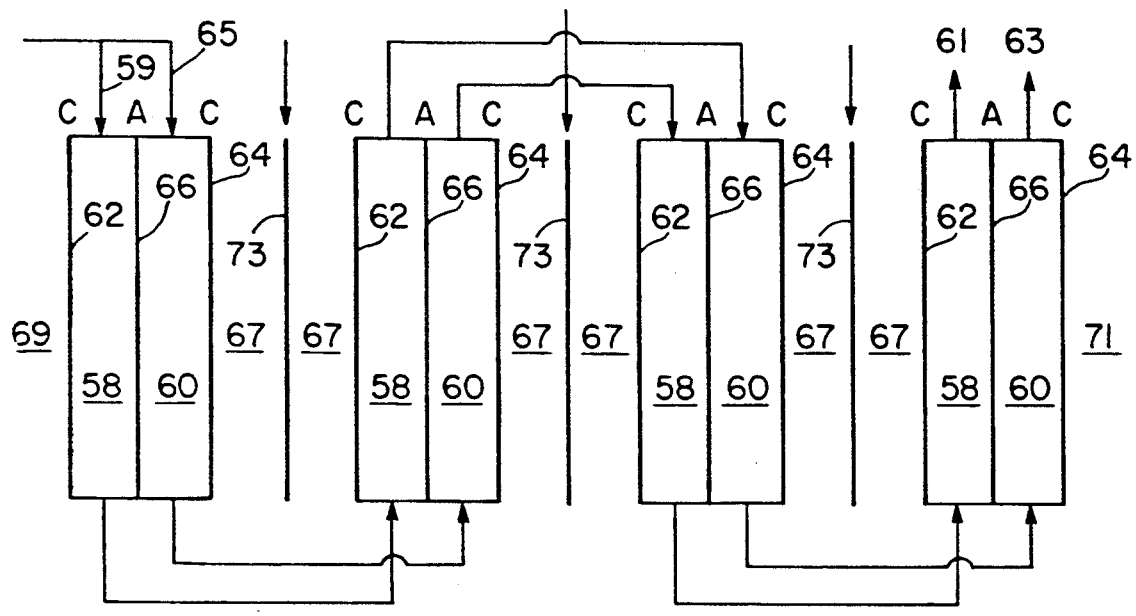
FIG. 8 is a schematic view showing one flow path arrangement useful when reversing polarity.
Figure 9:
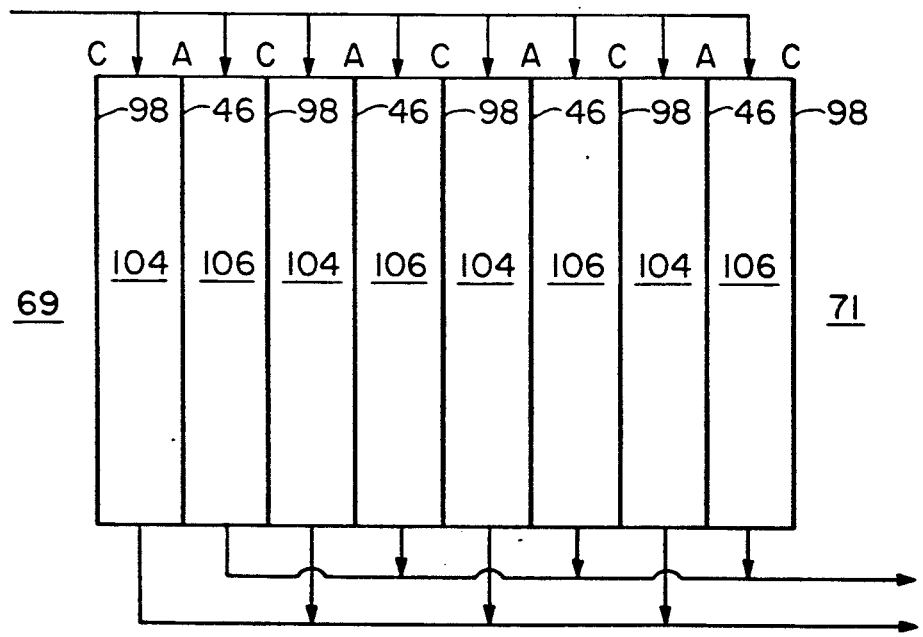
FIG. 9 is a schematic view showing an alternative flow path arrangement useful for reversing polarity.

Referring to FIG. 8, an arrangement of dual compartments is shown each of which includes two cation permeable membranes 62 and 64 and anion permeable membrane 66 separated by and bonded to spacers 58 and 60 as set forth above. When the polarity of electrodes 69 is negative, the compartment including spacer 58 is an ion depletion compartment while the compartment including spacer 60 is an ion concentration compartment. When the polarity of electrode 69 is positive and the polarity of electrode 71 is negative, the compartments including spacer 58 become ion concentration compartments and the compartments including spacer 60 comprise ion depletion compartments. The liquid for the depletion and concentration compartments passing through 58 and 60 can be passed in series as shown in FIG. 8 or in parallel therethrough as shown in FIG. 9 or combination of series in parallel flow. As shown in FIG. 8 the dual compartment structures are separated by neutral zones 67 which include screens 73. The neutral zones 67 merely function to prevent contact between membranes of adjacent dual compartments. The liquid for the neutral zones 67 can be passed in series or in parallel there-through and can be directed to waste or fed to the anode or cathode compartments prior to being sent to waste.

Referring to FIG. 9, an alternative arrangement of dual compartments is shown which excludes the need for neutral zones as set forth in FIG. 8. When the polarity of electrode 69 is negative and the polarity of electrode 71 is positive, the compartments including spacer 104 function as ion depletion compartments and the compartments including spacer 106 function as ion concentration compartments. When the polarity of electrode 69 is positive and the polarity of electrode 71 is negative, the compartments including spacer 104 become ion concentration compartments and the compartments including spacer 106 become ion depletion compartments. Neutral zones of the type shown in FIG. 8 can be interposed, if desired, between dual compartments wherein each dual compartment concludes an odd number, e.g., 3, 5, 7, 9 etc. of ion permeable membranes with anion permeable membranes alternating in position with cation permeable membranes.

EXAMPLE 1

Utilizing the arrangement depicted in FIG. 8, a four pass electrodeionization module was used during this test. The feed flow to the depletion and concentration compartments was approximately 0.2 l/min in each stream. The feed composition was approximately 100 ppm calcium, 50 ppm magnesium, 100 ppm sodium, 40 ppm bicarbonate, 120 ppm sulfate, and 90 ppm chloride, all as calcium carbonate. The feed conductivity was approximately 600 umhos with a Langelier Scaling Index (L.S.I.) of $-0.3$. The applied stack voltage was 20.8 volts with 0.78 amps. The product water out of the stack ranged from 2.1–0.7 microsiemens/cm whereas the concentrate was about 1200 microsiemens/cm. The depletion and concentration quality data was collected starting at the reversal point or time zero and every 30 seconds for the first five minutes and every minute thereafter until reversal occurred again at approximately 15 minutes. Both the depletion cycle and concentrate cycle data was collected separately. A Myron-L (EP Meter) conductivity meter was used to obtain the data. Satisfactory results also were obtained with a 2 pass module.

Figure 10:
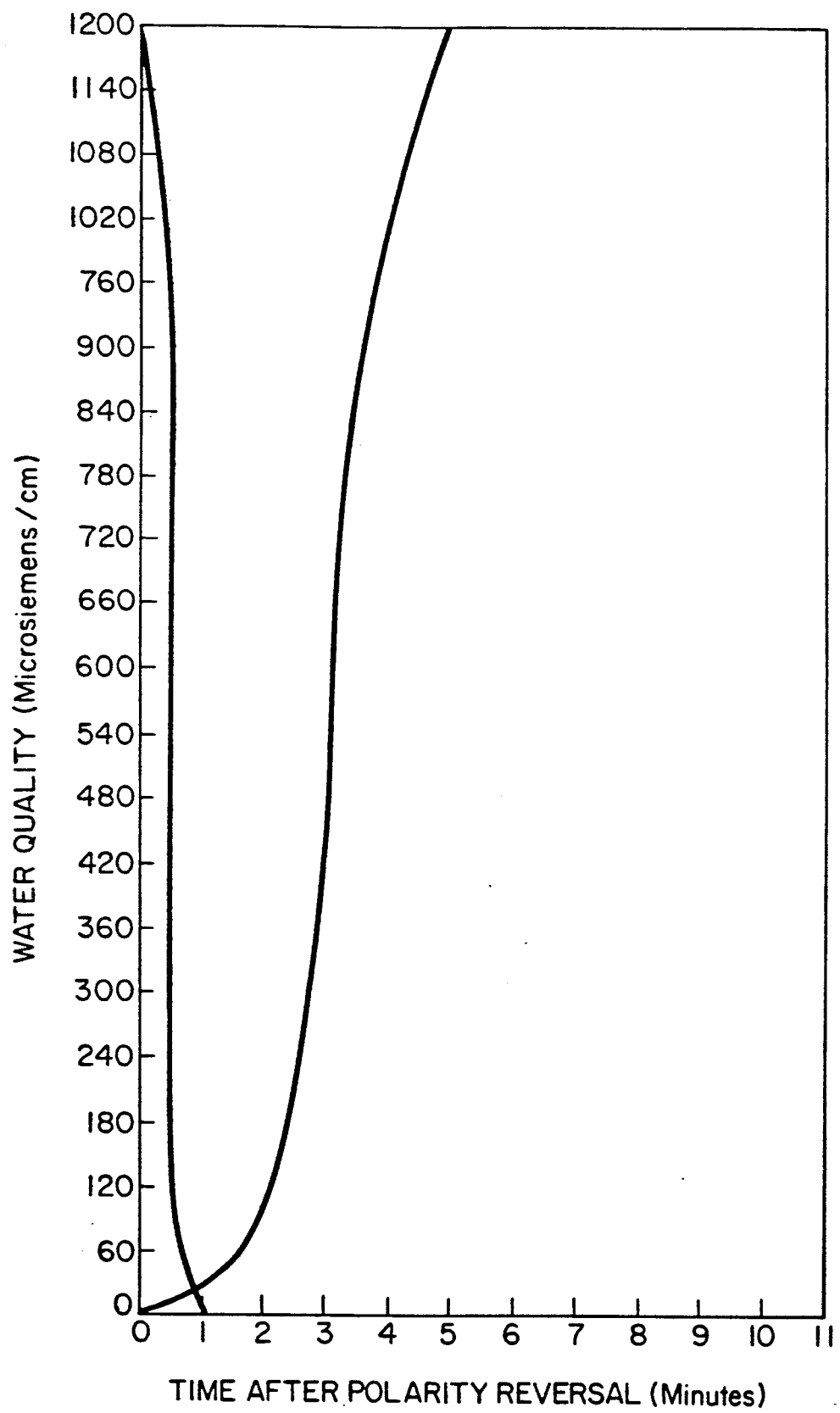
FIG. 10 shows the conductivity of water product and concentration as a function of polarity reversal in the electrodeionization step.
Figure 11:
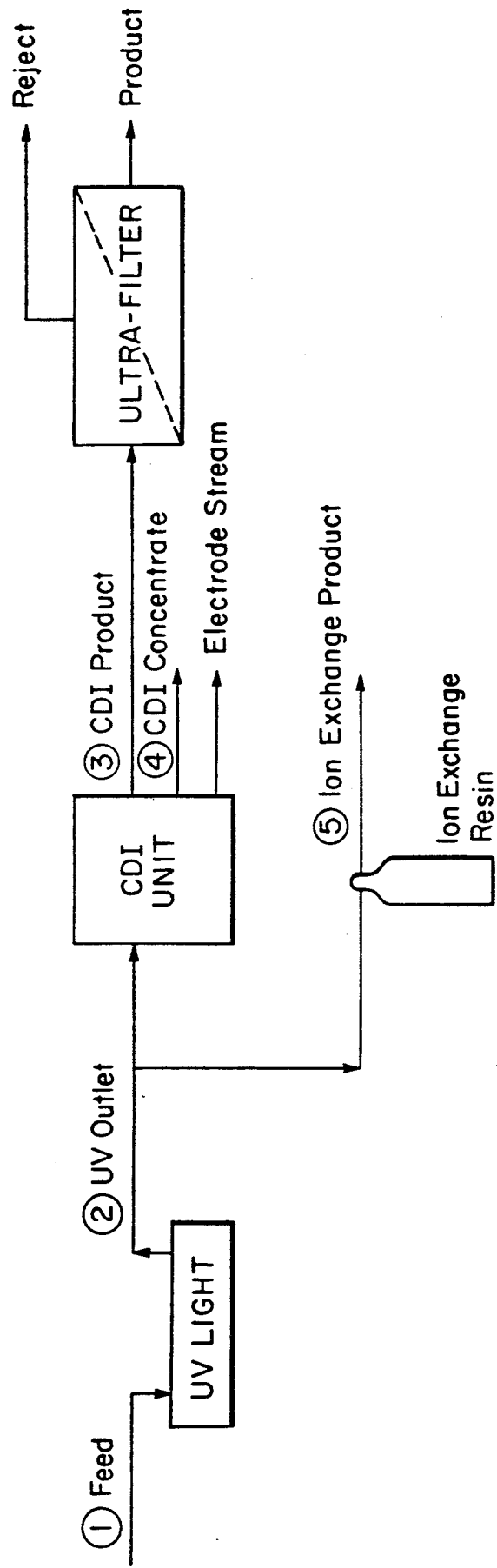
FIG. 11 is a flow diagram of the test process described in Example III.

As shown in FIG. 10, at reversal of voltage polarity, the newly formed depletion stream changes from 1200 microsiemens/cm to 6–7 microsiemens/cm with a 600 microsiemens/cm feed water within 1 minute. The newly formed concentrate stream has enough hydrogen ion and hydroxyl ion capacity from electroregeneration in the previous cycle to continue to produce 1.5 to 15 umho water for about 30 seconds even though ions are being added to the cells. The 30 second additional production of high quality water in the newly formed concentrate cells makes it advantageous to delay hydraulic switching of the streams providing enough time for the newly formed diluting cells to recover to dilute operation. Delayed switching also avoids water waste and allows for continuous flow. Typical reversal cycles can be between about two minutes and one hour and more usually between about 10 and 20 minutes.

EXAMPLE II

This example illustrates the improved separation efficiency obtained with the electrodeionization apparatus of this invention utilizing multiple passes through depletion compartments in a separation stage as compared to an electrodeionization apparatus utilizing a single pass through a depletion compartment in a separation stage.

Figure 4:
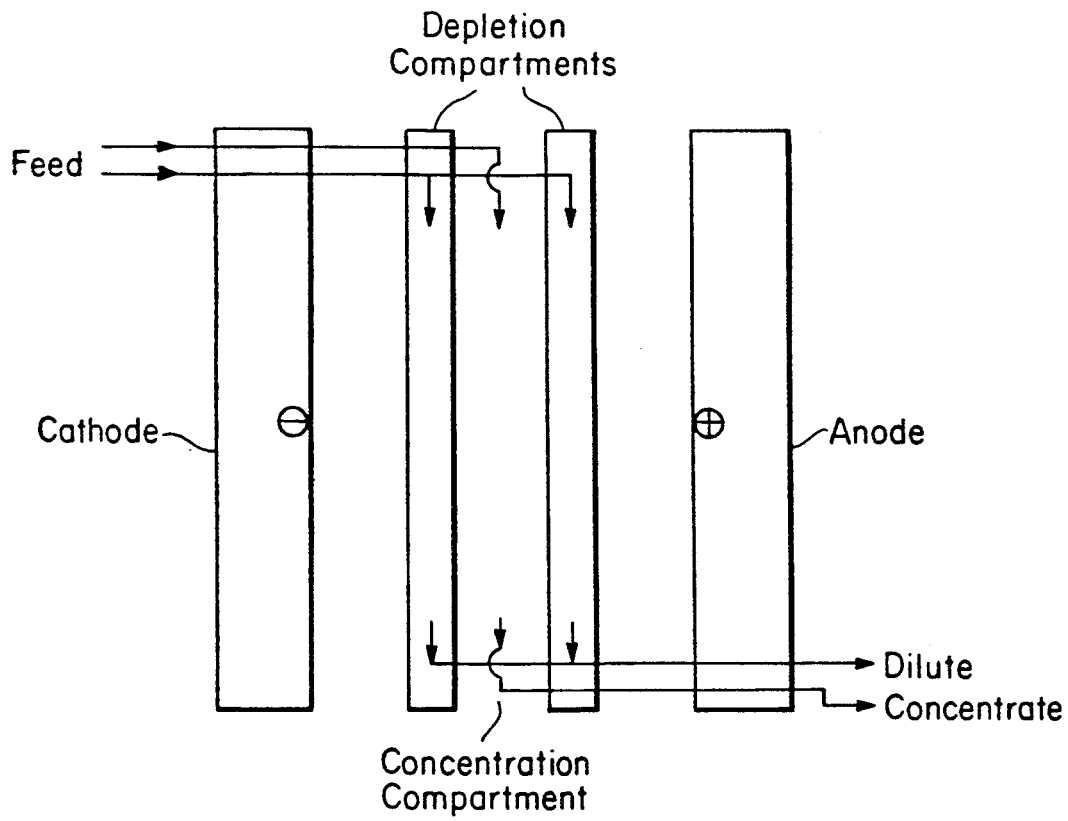
FIG. 4 is a schematic view of one method described in Example II.
Figure 5:
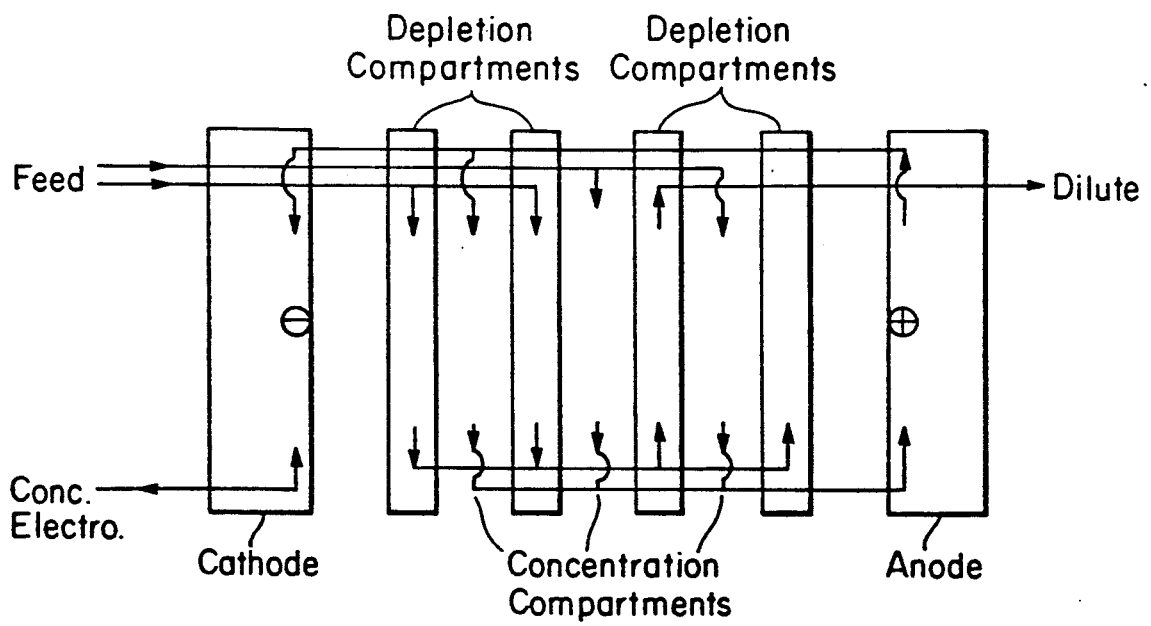
FIG. 5 is a schematic view of a second method described in Example II.

Two separation stacks were assembled for the comparative testing. The first stack containted two 26-inch long dilute cells arranged in parallel and sandwiched between one concentrate spacer and a pair of electrode spacers and electrodes (See FIG. 4). Two diluting cells were used in parallel to help minimize possible error. The second stack contained four 13-inch long dilute cells arranged to obtain two parallel two pass configurations (See FIG. 5). The three concentrate spacers were arranged for parallel flow and the cells were bound by electrode spacers and electrodes.

New membranes and new ion exchange resins were used in both stack assemblies. The two stacks were run simultaneously on the same liquid feed and with the same type power supplies. Data was collected at approximately the same time. Four series of tests were made and the test conditions are described under each series.

Series A Tests

Test conditions: Feed 295 umho sodium chloride, temperature 18° C., power source Condor 9 Volt, 1 Amp calculator battery charger (non-variable).

$D_1$ denotes dilute from 26-inch long flow path;

$C_1$ denotes concentrate from 26-inch long flow path.

$D_2$ and $C_2$ denote dilute and concentrate from 13-inch long flow path and $I_1$; $I_2$; $E_1$, $E_2$ denote amperage and voltage respectively.

The percent water recovery is expressed as $R_1$ and $R_2$.

Test I

The feed flow rate into each stack was adjusted at 400 ml/min and at steady operation the pertinent parameter were: $I_1=0.9$ A; $E_1=9.4$ V; $D_1=11.2$ umhos; $C_1=580$ umhos; $R_1=67\%$ $I_2=0.47$ A; $E_2=11.2$ V; $D_2=1.5$ umhos; $C_2=1220$ umhos; $R_2=67\%$ $D_2$ exceeds $D_1$ water quality by 7.5X.

Test II

Same as Test I with feed flow adjusted to 300 ml/min and at steady operation the pertinent parameters were: $I_l=0.73$ A; $E_1=9.7$ V; $D_1=10.0$ umhos; $C_1=600$ umhos; $R_1=67\%$ $I_2=0.43$ A; $E_2=11.4$ V; $D_2=0.5$ umhos; $C_2=1450$ umhos; $R_2=77\%$ $D_2$ exceeds $D_1$ water quality by 20X.

Test III

Same as Test I with feed flow adjusted to 500 ml/min and at steady operation the pertinent parameters were: $I_1=1.09$ A; $E_1=8.7$ V; $D_1=15.5$ umhos; $C_1=600$ umhos; $R_1=68\%$ $I_2=0.55$ A; $E_2=10.8$ V; $D_2=2.9$ umhos; $C_2=1300$ umhos; $R_2=80\%$ $D_2$ exceeds $D_1$ water quality by 5X.

Series B Tests

Test conditions: same as Series A but with a condor 12 volt[2], Amp calculator battery charger (nonvarable).

Test IV

The feed flow into each stack was adjusted to 500 ml/min and at steady operation the pertinent parameters were: $I_1=1.21$ A; $E_1=10.2$ V; $D_1=14.0$ umhos; $C_1=535$ umhos; $R_1=68\%$ $I_2=0.64$ A; $E_2=13.6$ V; $D_2=0.65$ umhos; $C_2=1350$ umhos; $R_2=78\%$ $D_2$ exceeds $D_1$ water quality by 21.5X.

Test V

Same as Test IV at a feed flow to each stack adjusted to 400 ml/min and at steady operation the pertinent parameters were: $I_1=1.1$ A; $E_1=12.7$ V; $D_1=10.5$ umhos; $C_1=600$ umhos; $R_1=68\%$ $I_2=0.59$ A; $E_2=13.9$ V; $D_2=0.3$ umhos; $C_2=1350$ umhos; $R_2=78\%$ $D_2$ exceeds $D_1$ water quality by 35X.

Series C Tests

Test conditions: Feed 225 umhos mixture of sodium chloride and sodium bicarbonate at approximately the same milligrams per liter; temperature 18° C.; power source 9 Volts, 1 Amp supply used in Series A tests.

Test VI

The feed flow to each stack was adjusted to 400 ml/min and at steady operation the pertinent parameters were: $I_1=0.91$ A; $E_1=9.6$ V; $D_1=6.5$ umhos; $C_1=450$ umhos; $R_1=68\%$ $I_2=0.46$ A; $E_2=11.4$ V; $D_2=0.24$ umhos; $C_2=1100$ umhos; $R_2=77\%$ $D_2$ exceeds $D_1$ water quality by 27X.

Test VII

Same as Test VI at a feed flow to each stack adjusted to 500 ml/min and at steady operation the pertinent parameters were: $I_1=0.91$ A; $E_1=9.6$ V; $D_1=9.0$ umhos; $C_1=485$ umhos; $R_1=72\%$ $I_2=0.50$ A; $E_2=11.3$ V; $D_2=1.65$ umhos; $C_2=1000$ umhos; $R_2=78\%$ $D_2$ exceeds $D_1$ water quality by 5.5X.

Test VIII

Same as Test VI at a feed flow to each stack adjusted to 300 ml/min and at steady operation the pertinent parameters were: $I_1=0.70$ A; $E_1=10.4$ V; $D_1=8.0$ umhos; $C_1=500$ umhos; $R_1=67\%$ $I_2=0.41$ A; $E_2=11.6$ V; $D_2=0.22$ umhos; $C_2=1100$ umhos; $R_2=77\%$ $D_2$ exceeds $D_1$ water quality by 36X.

Series D Tests

Test conditions: Same feed as in Series C; power source was changed to two similar vaiable supplies.

Test IX

The feed flow to each stack was adjusted to 400 ml/min and the applied cell pair voltage was set at 2 volts per cell pair plus 3 volts for the electrode voltage. At steady operation the pertinent parameters were: $I_1=0.64$ A; $E_1=7.0$ V; $D_1=16.0$ umhos; $C_1=440$ umhos; $R_1=65\%$ $I_2=0.41$ A; $E_2=11.0$ V; $D_2=1.60$ umhos; $C_2=850$ umhos; $R_2=74\%$ $D_2$ exceeds $D_1$ water quality by 10X.

Test X

Same as Test IX at a 3 volts per cell pair. At steady operation the pertinent parameters were: $I_1=0.75$ A; $E_1=9.0$ V; $D_1=9.0$ umhos; $C_1=500$ umhos; $R_1=65\%$ $I_2=0.52$ A; $E_2=15.0$ V; $D_2=0.70$ umhos; $C_2=980$ umhos; $R_2=74\%$ $D_2$ exceeds $D_1$ water quality by 13X.

In all ten comparative tests with varying feed flows, varying applied power and feed mixtures the 13-inch two pass stack exceeded the performance of the 26-inch single pass stack. The performance of the 13-inch two pass stack was better than the single 26-inch stack although the water recovery in 9 of the 10 tests was higher which resulted in a higher conductivity concentrate stream. The higher conductivity concentrate stream normally results in an increase in back diffusions which was not reflected in these tests.

As shown in Table II, all of the impurities are removed from the system so that the resin and membrane components of the CDI unit need not be regenerated.

TABLE I

| Test No. | Flow ml/min | Amperage $I_1$ | $I_2$ | Voltage $E_1$ | $E_2$ | umhos Dilute $D_1$ | $D_2$ | umhos Concentration $C_1$ | $C_2$ | % Recovery $R_1$ | $R_2$ | Feed |
|---|---|---|---|---|---|---|---|---|---|---|---|---|
| 1 | 400 | 0.90 | 0.47 | 9.4 | 11.2 | 11.2 | 1.5 | 580 | 1220 | 67 | 67 | 295 umho NaCl |
| 2 | 300 | 0.73 | 0.43 | 9.7 | 11.4 | 10.0 | 1.5 | 600 | 1450 | 67 | 67 | 295 umho NaCl |
| 3 | 500 | 1.09 | 0.55 | 8.7 | 10.8 | 15.5 | 2.9 | 600 | 1300 | 68 | 80 | 295 umho NaCl |
| 4. | 500 | 1.21 | 0.64 | 10.2 | 13.6 | 14.0 | 0.65 | 535 | 1350 | 68 | 78 | 295 umho NaCl |
| 5. | 400 | 1.10 | 0.59 | 12.7 | 13.9 | 10.5 | 0.30 | 600 | 1350 | 68 | 76 | 295 umho NaCl |
| 6. | 400 | 0.81 | 0.46 | 10.0 | 11.4 | 6.5 | 0.24 | 450 | 1100 | 68 | 77 | 295 umho NaCl |

EXAMPLE III

This example illustrates the substantially complete removal of TOC and ions from water by the process of this invention.

A flow diagram of the test system is shown in FIG. 1. The system has consistently produced low TOC, high resistivity product water over the course of the testing.

The UV unit used is Aquafine Corp. model CLS-24R/60 with 184.9 nm UV lamps (FIGS. 2A.2B, 2C and 2D). Only one of the two UV flow chambers was used. The CDI unit is a 5 gallons per minute (gpm), single stage unit (FIG. 3) operated at 150 volts D.C. The product flow rate is 5.5 to 8 gpm. A 20 ft² Ultrastak ultrafiltration unit available from Millipore Corporation is used as a final filter on the CDI product for particle removal. The flow rate through the IX bed is 2 gpm.

The TOC and resistivity of the feed (10), UV outlet (17) and CDI product (20). The results are summarized in Table I. The CDI concentrate (18) stream resistivity is also measured via the Anatel meter but the TOC in the concentrate stream can not be measured via the Anatel because the resistivity is too low (a minimum sample resistivity of 3 Megohm-cm is required for the Anatel meter.) Off line measurements of TOC of all of the streams have been below detection limits (50 ppb.)

Trace enrichment ion chromatography (IC) was used online to measure the dissolved anions and cations in all of the above streams. The IC results show that the concentration of several ions increases after the feed is treated with UV. The increase in dissolved ion concentration is due to ions liberated from organic compounds which are broken down by the UV. These ions are removed from the CDI product and concentrated in the CDI conc. The ratio of CDI product to concentrate stream flow rates is 10:1, so ions which are removed from the product will be 10X more concentrated in the concentrate stream. A brief summary of the pertinent IC results is included in Table II. It should be noted that the IC technique used measures only free, dissolved ions.

TABLE II

Summary of TOC, Resistivity and Ion Chromatography Results

| | Feed | UV Outlet | CDI Product | CDI Conc. |
|---|---|---|---|---|
| TOC (ppb) | 30–50 | 10–20 | 4–7 | UNK |
| Resist. (Megohm-cm) | 17.4–17.6 | 3–4 | 17.5–17.6 | 0.17–0.5 |
| IONS (average parts per trillion) | | | | |
| $Cl^-$ | 150 | 3500 | 40 | 43000 |
| $HCO_3^-$ | 1500 | 5700 | 1500 | 56000 |
| $NO_2^-$ | 20 | 100 | 20 | 300 |
| $BR^-$ | 40 | 140 | 40 | 900 |
| $NO_3^-$ | 40 | 180 | 40 | 1900 |
| $SO_4^{-2}$ | 60 | 560 | 60 | 2600 |
| $NH_4^+$ | 100 | 230 | 100 | 4100 |

EXAMPLE IV

This example illustrates that the process of this invention is capable of removing TOC. The water used as the feed water to the UV-CDI process of this invention was first treated by reverse osmosis followed by passage through a Milli Q water purifier apparatus available from Millipore Corporation, which comprises four water treatment cartridges containing sequentially activated carbon, ion exchange resin, ion exchange resin and an activated carbon/ion exchange resin mixture to obtain 18 megohm cm high purity water essentially free of organics. Prior to being fed into the UV treatment step, the water was injected with the mixture of organics set forth in Table IV in order to determine by gas chromatography the concentration of the injected organics passed into the concentration stream and remaining in the produced stream of the CDI unit. The CDI unit employed was that shown in FIG. 3 wherein both the dilution and concentration compartments were filled with mixed ion exchange resin; 60% anion exchange resin and 40% cation exchange resin. The process was run with no injection of organics ('blank' results), injection with organics but with the UV step inactivated and injected with organics with the UV step activated.

Samples were collected and analyzed after 1, 2, 4 and 7 hours of operation.

As shown in Table A, with the process of this invention there is significant reduction of methylene chloride by the UV oxidation step with further reduction if the product stream of the CDI unit.

Table B shows that the concentration of chloroform in the CDI concentrate stream increases steadily with hours of operation. The relatively high concentration of chloroform in the concentrate stream indicates that chloroform extracted from the CDI unit itself is being removed in the concentrate stream.

Table C shows the reduction of 1, 1, 2 trichloroethane by both the UV oxidation and removal from the CDI product stream.

TABLE A

RELATIVE METHYLENE CHLORIDE CONCENTRATION

| STREAM | FEED | UV OUTLET | CDI PRODUCT | CDI CONC. |
|---|---|---|---|---|
| RUN: | | | | |
| BLANK | 12 | 20 | 13 | 19 |
| UV OFF | 90 | 106 | 108 | 71 |
| 1 HOUR | 102 | 93 | 86 | 89 |
| 2 HOURS | 111 | 88 | 81 | 81 |
| 4 HOURS | 97 | 42 | 37 | 76 |
| 7 HOURS | 62 | 43 | 35 | 38 |

TABLE B

RELATIVE CHLOROFORM CONCENTRATION

| STREAM | FEED | UV OUTLET | CDI PRODUCT | CDI CONC. |
|---|---|---|---|---|
| RUN: | | | | |
| BLANK | 58 | 57 | 66 | 246 |
| UV OFF | 85 | 97 | 94 | 277 |
| 1 HOUR | 104 | 84 | 83 | 381 |
| 2 HOURS | 110 | 86 | 91 | 412 |
| 4 HOURS | 104 | 69 | 70 | 498 |
| 7 HOURS | 97 | 78 | 79 | 637 |

TABLE C

RELATIVE 1,1,2 TRICHLOROETHANE CONCENTRATION

| STREAM | FEED | UV OUTLET | CDI PRODUCT | CDI CONC. |
|---|---|---|---|---|
| RUN: | | | | |
| BLANK | 6 | 0 | 31 | 17 |
| UV OFF | 123 | 73 | 43 | 7 |
| 1 HOUR | 95 | 56 | 29 | 21 |
| 2 HOURS | 101 | 64 | 31 | 11 |
| 4 HOURS | 106 | 55 | 20 | 12 |
| 7 HOURS | 75 | 57 | 18 | 9 |

I claim:

1. The process for purifying water to remove organics and ionic species therein which comprises:

exposing said water to ultraviolet radiation to effect oxidation of said organics, providing and electrodeionization apparatus comprising;

a cathode compartment at a first end of said apparatus, an anode compartment at an end of said apparatus opposite said first end, a plurality of said ion depletion compartments alternating with ion concentration compartments positioned between said cathode compartment and said anode compartment, an anion permeable membrane and a cation permeable membrane, said anion permeable membrane and said cation permeable membrane being bonded to a spacer to effect sealing against water leakage between said ion depletion compartment and, each of said ion depletion compartments containing an ion exchange solid composition, passing said water exposed to ultraviolet radiation through the ion depletion compartments of said depletion compartments of said electrodionization apparatus, passing a second liquid for accepting ions from said water, through said concentration compartments while said water is passed through said ion depletion compartments, applying an electrical voltage between an anode in said anode compartment and a cathode in said cathode compartment, and recovering purified water from said depletion compartment.

2. The process of claim 1 wherein the ion exchange comprises a mixture of anion exchange resin beads and cation exchange resin beads and wherein the volume ratio of anion exchange resin beads to cation exchange resin beads in said ion depletion compartments is between 4.0 and 0.5.

3. The process of claim 1 wherein said water is passed through at least two ion depletion compartments positioned between said anode and said cathode.

4. The process for purifying water to remove organics and ionic species therein which comprises:

exposing said water to ultraviolet radiation to effect oxidation of said organics, providing an said electrodeionization apparatus comprising;

a cathode compartment at a first end of said apparatus, an anode compartment at an end of said apparatus opposite said first end, a plurality of said ion depletion compartments alternating with ion concentration compartments positioned between said cathode compartment and said anode compartment, each of said ion depletion compartments comprising a spacer and a plurality of subcompartments formed by a plurality of ribs extending along the length of each of said ion depletion compartments, each of said subcompartments containing an ion exchange solid composition, each of said subcompartments having a width defined by the distance between said ribs of between about 0.3 and 4 inches and a thickness as defined by the distance between an anion permeable membrane and a cation permeable membrane in said ion depletion compartments is between 2.0 and 0.5.

an anion permeable membrane and a cation permeable membrane, said anion permeable membrane and said cation permeable membrane being bonded to a spacer to effect sealing against water leakage between said ion depletion compartment and, passing said water exposed to ultraviolet radiation through the ion depletion compartments of said depletion compartments of said electrodionization apparatus, passing a second liquid for accepting ions from said water, through said concentration compartments while said water is passed through said ion depletion compartments, applying an electrical voltage between an anode in said anode compartment and a cathode in said cathode compartment, and recovering purified water from said depletion compartment.

5. The process of claim 4 wherein the width of said subcompartment is between about 0.5 to 1.5 inches.

6. The process of claim 5 wherein said water is passed through at least two ion depletion compartments positioned between said anode and said cathode.

7. The process of claim 6 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

8. The process of claim 5 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

9. The process of claim 4 wherein the thickness of said subcompartment is between about 0.6 and 0.125 inches.

10. The process of claims 4, 5 or 9 wherein the ion exchange comprises a mixture of anion exchange resin beads and cation exchange resin beads and wherein the volume ratio of anion exchange resin beads to cation exchange resin beads in said ion depletion compartments is between 4.0 and 0.5.

11. The process of claim 10 wherein said water is passed through at least two ion depletion compartments positioned between said node and said cathode.

12. The process of claim 11 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

13. The process of claim 10 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

14. The process of claim 9 wherein said water is passed through at least two ion depletion compartments positioned between said anode and said cathode.

15. The process of claim 14 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

16. The process of claim 9 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

17. The process of claim 4 wherein said water is passed through at least two ion depletion compartments positioned between said anode and said cathode.

18. The process of claim 17 wherein said water is passed through at least two ion depletion compartments positioned between said anode and said cathode.

19. The process of claim 18 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

20. The process of claim 17 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

21. The process of claim 4 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

22. The process of claim 21 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

* * * * *